United States Patent [19]

Ammann

[11] Patent Number: 5,790,248
[45] Date of Patent: Aug. 4, 1998

[54] LASER BEAM LEVELLING DEVICE

[75] Inventor: Hans-Rudolf Ammann, Amriswil, Switzerland

[73] Assignee: Ammann Lasertechnik AG, Amriswil, Switzerland

[21] Appl. No.: 773,760

[22] Filed: Dec. 24, 1996

[30] Foreign Application Priority Data

Dec. 29, 1995 [CH] Switzerland .......................... 3704/95

[51] Int. Cl.[6] ............................................ G01C 9/16
[52] U.S. Cl. ................................... 356/250; 33/283
[58] Field of Search .............................. 356/138, 248, 356/250, 147, 149; 33/DIG. 21, 356, 273, 291, 290, 295, 299, 402, 285–286, 283, 281, 282

[56] References Cited

U.S. PATENT DOCUMENTS

| | | | |
|---|---|---|---|
| 5,033,848 | 7/1991 | Hart et al. | 356/149 |
| 5,075,977 | 12/1991 | Rando | 356/137 |
| 5,218,770 | 6/1993 | Toga | 356/138 |
| 5,331,395 | 7/1994 | Piske et al. | 356/138 |

*Primary Examiner*—K. Hantis
*Attorney, Agent, or Firm*—Bachman & LaPointe, P.C.

[57] ABSTRACT

The present invention provides a laser beam levelling device which is provided with two rotatable heads wherein a horizontal laser plane can be emitted from the first head which is rotatable round a vertical axis and a vertical laser plane can be emitted from the second head which is rotatable round a horizontal axis. An apparatus consisting of two separate pendulums is provided for self-levelling of the two laser planes. One pendulum is mounted substantially in the lower extension of the axis of rotation of the first head. The other pendulum is arranged to the side of it in its own vertical axis. The first pendulum is pivotal about a substantially horizontal axis and the second pendulum about an axis which is also horizontal and at right angles thereto. A laser beam produced by a laser light source is guided by reflectors such that it is deflected from one pendulum to the other pendulum and from there into the rotating heads. For this purpose, the reflector of the pendulum passed second by the laser beam is designed as a pentagonal light-splitting prism which splits the laser light 50—50.

15 Claims, 2 Drawing Sheets

LASER BEAM LEVELLING DEVICE

BACKGROUND OF THE INVENTION

The present invention relates to a laser beam levelling device with means for producing a laser beam and with at least one rotatable head which emits the laser beam, wherein the laser beam which can be set into rotation by the rotating head forms the laser plane used for measurement purposes and wherein a device operating by the pendulum principle is provided for the self-levelling of the laser plane.

Laser beam levelling devices of this type serve to define a plane which is usually horizontal and are used for building purposes. The laser beam issuing from the device is set into horizontal rotation by a rotating head. The laser beam rotating similarly to the light of a lighthouse forms the laser plane. The laser beam can be received at any point round the levelling device by means of a receiver. The receiver can be arranged, for example, on a measuring rod. It is therefore possible to determine whether the imaginary plane between the levelling device and the receiver is exactly horizontal. A laser beam levelling device of this type allows a plurality of measuring and control tasks to be carried out. Laser beam levelling devices are used, for example, in excavation and grading of excavations, in the monitoring of concrete foundations and concrete ceilings, in the alignment of shuttering or walls and much more. Laser beam levelling devices which are more complex have various apparatuses to enable the laser plane to be inclined by a desired amount so inclined surfaces can also be measured.

Known laser beam levelling devices are equipped with an apparatus for self-levelling which shifts the laser beam or the laser plane exactly into the horizontal. An effective method of doing this involves suspending the optical laser beam arrangement in the manner of a pendulum. However, this is associated with a few technical problems in the case of a laser beam levelling device intended to operate with maximum precision. The pendulum apparatus has to be designed such that it can compensate an oblique position of the laser beam levelling device in various directions. For this purpose, it has to be able to swing freely in at least two directions at right angles to one another. If the optical laser beam arrangement with lens, laser light source and corresponding electrical wiring is arranged on this pendulum apparatus, further technical problems arise. Even though the pendulum principle as such is simple, its practical conversion is relatively complex and therefore expensive in the present case.

If a vertical surface, for example a wall, rather than a horizontal surface is to be measured, it is known to lie the laser beam levelling device horizontally. The rotating laser beam is then irradiated vertically but the horizontal pendulum apparatus is put out of operation. For this reason, self-levelling does not operate in this position. The laser beam levelling device therefore has to be laboriously aligned by hand using spirit levels. However, exact alignment is rarely guaranteed, in particular on uneven ground on a building site. Furthermore, the risk is very high on a building site that the device will be pushed against or unnoticeably moved by vibrations. As it does not automatically level itself in the horizontal position, time often elapses before the defect is noticed. Until then, the corresponding wall has possibly been put in obliquely.

SUMMARY OF THE INVENTION

The object of the invention is therefore to provide a laser beam levelling device of the generic type which on the one hand can be produced relatively simply and inexpensively and on the other hand operates very exactly. Furthermore, it should also be adapted to be equipped for the measurement of a vertical surface, self-levelling also operating perfectly in this case.

Accordingly, the present invention provides a laser beam levelling device with means for producing a laser beam and with at least one rotatable head which emits the laser beam, the laser beam which can be set into rotation by a rotating head forming a laser plane which can be used for measurement purposes and an apparatus operating by the pendulum principle being provided for self-levelling of the laser plane, the pendulum apparatus having at least two pendulums which are each pivotal round their own pivot axis, the two pivot axes lying substantially at right angles to one another, and the laser beam produced by a laser light source being guided by reflectors such that it is deflected from one pendulum to the other pendulum and from there into the rotatable head.

BRIEF DESCRIPTION OF THE DRAWINGS

The invention will now be described in detail, by way of example, with reference to the drawings, in which.

DETAILED DESCRIPTION OF PREFERRED EMBODIMENT

Figure 1:
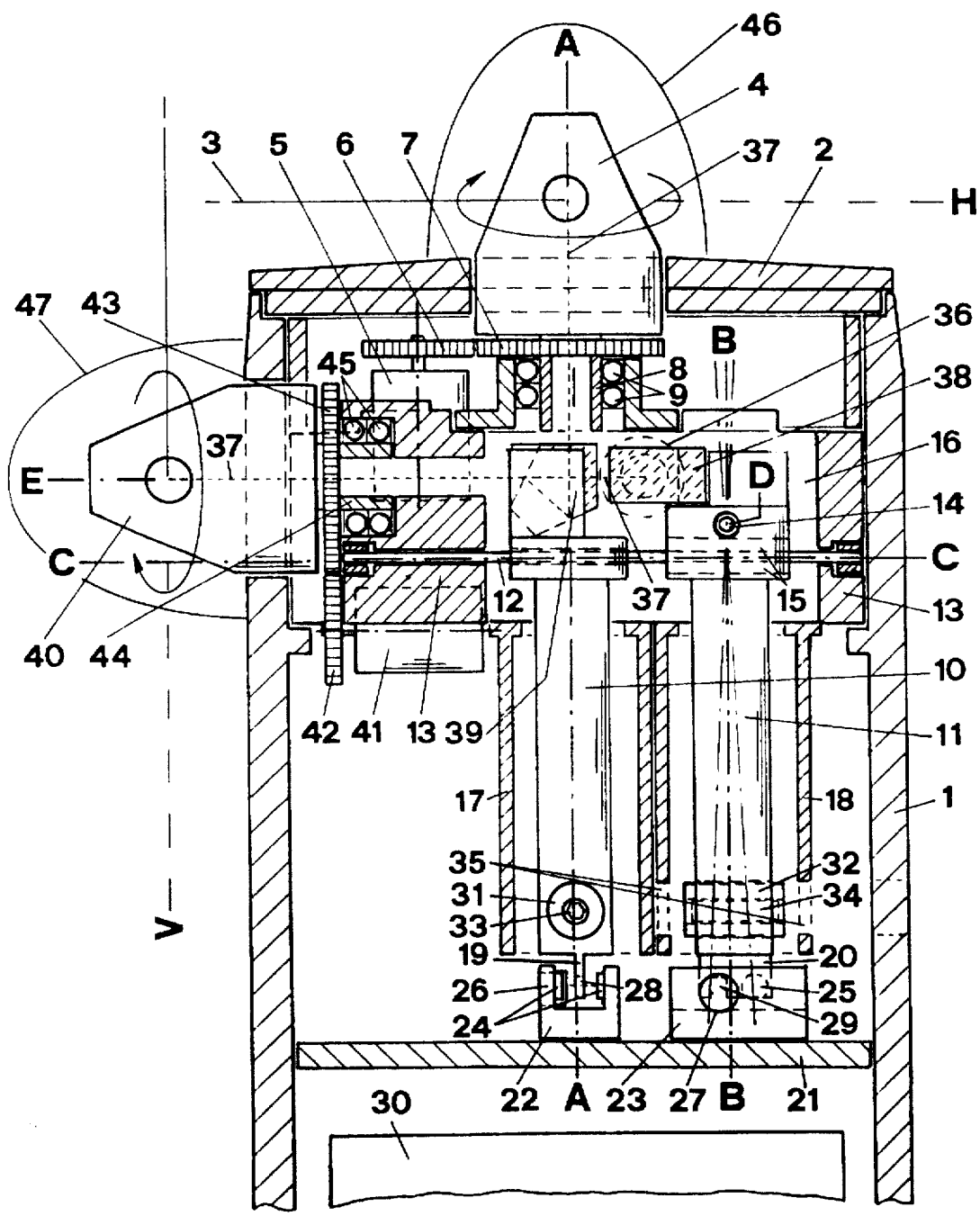
FIG. 1 is a vertical section through one embodiment of a laser beam levelling device according to the invention.

The laser beam levelling device is essentially arranged in a cylindrical housing 1. A rotatable head 4 which emits the laser beam 3 is arranged thereon or in the region of its cover 2. The laser beam 3 is pivoted through 360° by its rotating movement, so a horizontal laser plane H which can be used for measurement purposes is formed. The laser beam can be received at any point 360° round the laser beam levelling device by means of a receiver. The head 4 is driven by an electric motor 5. For this purpose, a gear wheel 7 which cooperates with a gear ring 7 rotationally engaged with the head 4 is provided on its drive shaft. The head 4 or a length of tube 8 connected thereto is guided in two ball bearings 9.

The suspension apparatus is arranged beneath the head 4 and the components serving to mount and drive it. In contrast to former pendulum apparatuses, this one consists of two separate pendulums 10 and 11. One pendulum 10 is mounted substantially in the lower extension of the axis of rotation A-A of the head 4. The second pendulum 11 is arranged to the side of it in its own vertical axis B-B. The first pendulum 10 is pivotal round a substantially horizontal axis C-C. The second pendulum 11 is pivotal round its own axis D-D, the axis D-D being located substantially at right angles to the pivot axis C-C of the first pendulum 10. The pivot axis C-C of the first pendulum 10 is formed by a long bolt 12 which is guided on the one hand through the upper region of the pendulum 10 and, on the other hand, with both ends in a mounting 13 in each case. A bolt 14 forming the pivot axis D-D of the second pendulum 11 is also guided in this mounting 13.

As the two pendulums 10 and 11 are arranged next to one another, whereby the second pendulum 11 has to be located in the pivot axis C-C of the first pendulum 10, the second pendulum 11 is inevitably located in the region of the bolt 12 forming the pivot axis C-C of the first pendulum 10. To prevent this bolt 12 from obstructing the pendulum movements of the second pendulum 11, a tunnel-like through-orifice 15 for the bolt 12 is provided in the second pendulum 11. The width of this through-orifice 15 is dimensioned such that the bolt 12, even during the maximum pendulum swings of the second pendulum 11, cannot touch the wall thereof.

The mounting 13 is shaped, for example, such that it consists of an insert which can be inserted into the housing 1 and has a recess 16 for the two pendulums 10 and 11. A respective receiving tube 17 and 18 for the two pendulums 10 and 11 can also be fastened on the mounting 13 at the bottom. The receiving tubes 17 and 18 are each dimensioned such that they do not impair the necessary pendulum movement of the two pendulums 10 and 11 but possibly prevent pendulum swings exceeding the desired range.

At their lower end, the two pendulums 10 and 11 which have, for example, a cylindrical cross section, are each provided with a plate-shaped metallic web 19 and 20. This web 19 and 20 extends in the direction of the pendulum movement. Two receivers 22 and 23 which are U-shaped in cross section are arranged on a corresponding mounting 21. They are at right angles to one another and are dimensioned and orientated such that the respective pendulum web 19 and 20 can move freely and with substantially uniform spacing from the two free U-webs of the respective U-shaped receivers 22 and 23. Respective magnets 24 and 25 are arranged on the U-webs of the two U-shaped receivers. Although the two webs 19 and 20 arranged at the ends of the pendulums never come into contact with the corresponding receivers 22 and 23, damping of the pendulum movements is achieved due to the magnets 24 and 25. The strength of the magnets 24 and 25 should be selected such that the intended damping is achieved but the pendulum movement is not otherwise impaired. The aim of this arrangement is to dampen excessively jittery pendulum reactions to vibrations.

A respective light barrier 26 and 27 can also be provided on the U-shaped receivers 22 and 23. It can be determined by means of a slot-like recess 28 or 29 in the respective web 19 or 20 whether the respective pendulum 10 or 11 is located in the permitted range of pendulum movement. If this range were exceeded and the pendulum 10 or 11 were pending somewhere, for example on the receiving tube 17 or 18, its operation would be unnoticeably disturbed. The light barrier 26 and 27 operates as follows: in normal cases, the beam of light passes through because it is located in the region of the slot-like recess 28 or 29 of the web 19 or 20. However, if the pendulum swing is too great, the recess 28 or 29 moves out of the range of the light barrier 26 or 27. The light barrier 26 or 27 is therefore interrupted. A signal is triggered which passes to the device controller 30. A warning for the operator is activated via the device controller 30 so the operator can erect the laser beam levelling device more desirably. This warning can be given in various ways. For example, a buzzing tone is conceivable. However, automatic extinction of the laser beam is better. This effectively prevents incorrect measurements from being taken.

Finally, a weight 31 and 32 can be provided on the lower region of the two pendulums 10 and 11 to improve the pendulum action. To compensate any inaccuracies in production and assembly, a respective adjustable weight, for example in the form of a screw pin 33 or 34 can be provided. This allows precise adjustment of the two pendulums 10 and 11. To allow access to the screw pins 33 and 34 by a tool, the respective receiving tubes 17 and 18 can be provided with an access orifice 35.

Figure 2:
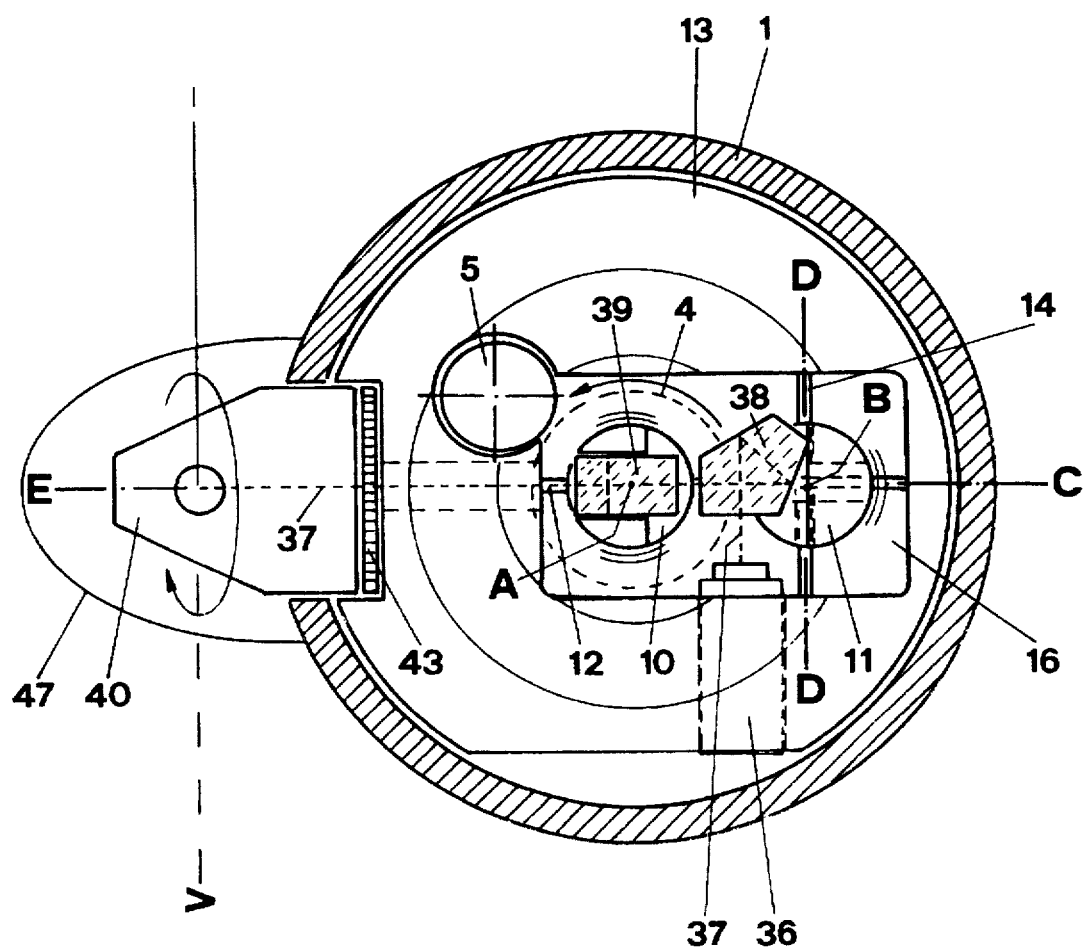
FIG. 2 is a horizontal cross section through the levelling device shown in FIG. 1.

With regard to actual operation of the pendulum apparatus comprising two pendulums 10 and 11, a laser light source 36 is arranged outside the two pendulums 10 and 11, i.e. separately from them (see FIG. 2). The laser light source 36 transmits a laser beam 37 to a reflector 38 arranged in the upper end region of the second pendulum 11. The laser beam 37 is deflected in the direction of the other pendulum 10 by this reflector 38, for example a pentagonal prism. In the upper end region of the pendulum 10, a reflector 39, in particular a pentagonal prism is in turn arranged by means of which the laser beam 37 is now deflected upwardly to the rotating head 4. A further reflector or pentagonal prism is provided in a known manner in the rotating head 4 in order to deflect the laser beam 37 such that the horizontal laser plane H is formed in conjunction with head rotation. The dual pendulum design ensures that this laser plane H lies exactly horizontally.

This design accordingly affords a further advantageous possibility. It is possible to provide a second rotatable head 40 by means of which a second vertical laser plane V can be irradiated. For this purpose, the reflector 39 of the pendulum 10 lying in the axis A-A or pivot axis C-C is preferably designed as a pentagonal light-splitting prism. The light should be split such that about 50% of the laser beam 37 are guided upwardly to the first head 4 and the remaining 50% straight on to the second head 40. Elsewhere, the design of the second rotatable head 40 corresponds to that of the first head 4. An electric motor 41 with gear wheel 42 and a gear ring 43 rotationally engaged with the head 40 is also provided here.

The head 40 is also guided in two ball bearings 45 by means of a length of tube 44. The two heads 4 and 40 have the common feature that the laser beam 37 passes through the internal cross section of said length of tube 8 and 44 into the interior of the head 4 and 40 and is deflected there to form the respective laser plane H and V.

For protection from moisture and dust, the two heads 4 and 40 are preferably provided with a cover 46 and 47 of any design. It should be ensured that the region for passage of the laser beam is transparent, i.e. allows the laser beam through without obstruction. The two covers 46 and 47 are merely indicated in the drawings.

The laser beam levelling device can also be designed differently from the above-described embodiment in the context of the invention. In particular, the mounting of the two pendulums 10 and 11 could also be achieved differently. For example, the pendulums could be suspended in an oscillating manner on a thread or wire rather than being mounted by means of a bolt guided in a ball bearing.

It is also pointed out that a laser light source which generates laser light visible by the eye can be used instead of a laser beam which is invisible to the naked eye and is only visible to a suitable receiver. In this case, a receiver is superfluous, at least for short distances.

The described laser beam levelling device affords a number of advantages. Although it can be produced relatively easily, it operates with high precision. Measurement of a vertical is also possible in the design with two rotatable heads 4 and 40. It should be emphasised in particular that the vertical laser plane V is also self-levelled automatically and continuously. The advantage also arises that the horizontal laser plane H and the vertical laser plane V are transmitted simultaneously. It is therefore possible to carry out simultaneous measurement tasks in the horizontal and in the vertical. Therefore, a floor and a wall can be measured and aligned very exactly simultaneously with a single laser beam levelling device which is also relatively inexpensive, on a building site. The risk of errors in measurement owing to a laser beam levelling device which has unnoticeably deviated from the vertical is completely eliminated.

What is claimed is:

1. A laser beam levelling device with means for producing a laser beam and with at least one rotatable head which emits the laser beam, the laser beam which can be set into rotation by a rotating head forming a laser plane which can be used for measurement purposes and a pendulum apparatus operating by the principle being provided for self-levelling of the laser plane, the pendulum apparatus having at least two pendulums each said pendulum being pivotal about its own respective pivot axis, the two pivot axes lying substantially at right angles to one another, and the laser beam produced by a laser light source being guided by reflectors such that it is deflected from one pendulum to the other pendulum and from there into the rotatable head.

2. A laser beam levelling device as claimed in claim 1, in which two rotatable heads are provided, a first of said heads being arranged to emit a horizontal laser plane and being rotatable about a vertical axis and a second of said heads being arranged to emit a vertical laser plane and being rotatable about a horizontal axis.

3. A laser beam levelling device as claimed in claim 2, in which a reflector of the said other pendulum is designed as a light splitter, a proportion of the laser beam being guided to the first rotatable head and a proportion of the laser beam to the second rotatable head.

4. A laser beam levelling device as claimed in claim 3, in which the reflector of the said other pendulum is designed as a pentagonal light-splitting prism.

5. A laser beam levelling device as claimed in claim 3, in which the said other pendulum is arranged such that it is located substantially in the region of the vertical axis corresponding to the axis of rotation of the first head whereas the said one pendulum is arranged to the side of it in its own substantially vertical axis.

6. A laser beam levelling device as claimed in claim 5, in which the second head is arranged such that its reflector and the reflectors on the pendulums lie substantially in a straight line so the laser beam directed toward the second head passes substantially in a straight line through the reflectors of the two pendulums to the reflector of the second head.

7. A laser beam levelling device as claimed in claim 1, in which the laser light source is arranged outside the two pendulums separately from them such that the laser beam is directed to the reflector of one pendulum arranged outside the axis of rotation of the first rotatable head.

8. A laser beam levelling device as claimed in claim 1, in which reflectors of the two pendulums are located in the region of the upper end of the pendulum and are each arranged above the respective pivot axis of the respective pendulum.

9. A laser beam levelling device as claimed in claim 1, in which the pivot axes of the two pendulums are each formed by a bolt guided in a mounting, the bolt of one pendulum being guided through the region of the other pendulum owing to an adjacent arrangement of the two pendulums, a tunnel-like through-orifice being provided in the said other pendulum for the bolt of the said one pendulum of which the width is dimensioned such that the second pendulum can oscillate without obstruction in a predetermined range.

10. A laser beam levelling device as claimed in claim 1, in which the two pendulums are each surrounded with spacing by a receiving tube by means of which the range of the pendulum movement is limited.

11. A laser beam levelling device as claimed in claim 1, in which the two pendulums are each provided in their lower end region with a plate-shaped metallic web which extends in each case in the direction of pendulum movement, respective magnets being arranged on a corresponding mounting separately from the pendulums such that they lie substantially parallel to the webs of the pendulums and therefore can never come into contact with the webs, the magnets being designed such that the pendulum movements are dampened by them but are not prevented.

12. A laser beam levelling device as claimed in claim 1, in which the two pendulums have, in their lower end region, a respective slot-shaped recess which is orientated transversely to the pendulum movement, wherein it can be determined by means of a respective light barrier arranged separately from the pendulum and acting in the region of the slot-like recess whether the pendulum is located in the permitted range of pendulum movement, in other words whether the slot-like recess is located in the region of the light barrier or whether it is interrupted.

13. A laser beam levelling device as claimed in claim 12 and including a controller which is arranged to activate a warning device in the event of interruption of the laser beam.

14. A laser beam levelling device as claimed in claim 1, in which an adjustable weight is provided on the lower region of each of the two pendulums, allowing precise adjustment of the said pendulums.

15. A laser beam levelling device as claimed in claim 14, in which each adjustable weight comprises a respective screw pin.

* * * * *

UNITED STATES PATENT AND TRADEMARK OFFICE
CERTIFICATE OF CORRECTION

PATENT NO. : 5,790,248
DATED : August 4, 1998
INVENTOR(S) : Hans-Rudolf Ammann

It is certified that error appears in the above-identified patent and that said Letters Patent is hereby corrected as shown below:

In Column 5, Claim 1, Line 9, after "by the" insert --pendulum--.

Signed and Sealed this

Second Day of March, 1999

Attest:

Q. TODD DICKINSON

*Attesting Officer*　　　Acting Commissioner of Patents and Trademarks